(12) United States Patent
Broden et al.

(10) Patent No.: US 7,401,522 B2
(45) Date of Patent: Jul. 22, 2008

(54) PRESSURE SENSOR USING COMPRESSIBLE SENSOR BODY

(75) Inventors: David A. Broden, Andover, MN (US); Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/138,977

(22) Filed: May 26, 2005

(65) Prior Publication Data

US 2006/0278005 A1 Dec. 14, 2006

(51) Int. Cl.
*G01L 13/00* (2006.01)

(52) U.S. Cl. .............................. 73/716; 73/715; 73/723; 73/753

(58) Field of Classification Search ............ 73/700–756
See application file for complete search history.

(56) References Cited

U.S. PATENT DOCUMENTS

| | | | | |
|---|---|---|---|---|
| 3,410,135 A | | 11/1968 | Reynaud | 73/141 |
| 4,604,901 A | * | 8/1986 | Kagi | 73/731 |
| 4,623,813 A | * | 11/1986 | Naito et al. | 310/313 R |
| 4,739,666 A | * | 4/1988 | Hafner et al. | 73/862.68 |
| 4,864,874 A | * | 9/1989 | Hafner | 73/862.382 |
| 5,012,677 A | | 5/1991 | Shimada et al. | 73/721 |
| 5,094,109 A | | 3/1992 | Dean et al. | 73/718 |
| 5,144,841 A | * | 9/1992 | Brouwers et al. | 73/706 |
| 5,291,795 A | * | 3/1994 | Hafner | 73/862.629 |
| 5,531,120 A | * | 7/1996 | Nagasu et al. | 73/706 |
| 6,003,219 A | | 12/1999 | Frick et al. | |
| 2005/0041375 A1 | | 2/2005 | Rosenau | 361/524 |

FOREIGN PATENT DOCUMENTS

DE 1 932 899 1/1971

OTHER PUBLICATIONS

Notification of Transmittal of the International Search Report and the Written Opinion of the International Searching Authority, or the Declaration for PCT/US2006/019955.

* cited by examiner

*Primary Examiner*—Andre J. Allen
*Assistant Examiner*—Jermaine Jenkins
(74) *Attorney, Agent, or Firm*—Westman, Champlin & Kelly, P.A.

(57) ABSTRACT

A pressure sensor including a deformable sensor body formed of a compressible material. A deformation sensor is embedded in the deformable sensor body and has an electrical property which changes in response to deformation of the deformable sensor body. Electrical connections which extend from outside the deformable sensor body to the embedded deformation sensor to provide an indication of an applied line pressure or differential pressure.

20 Claims, 5 Drawing Sheets

PRESSURE SENSOR USING COMPRESSIBLE SENSOR BODY

BACKGROUND OF THE INVENTION

The present invention relates to pressure transmitters of the type used in industrial process control systems. More specifically, the present invention relates to a pressure sensor for use in a pressure transmitter.

Pressure transmitters are used in industrial process control systems to monitor pressures of process fluids. A pressure transmitter includes a pressure sensor which is coupled to a process fluid and provides an output in response to pressure applied by the process fluid. Two well known types of pressure transmitters is the Model 3051 and 3095 transmitters available from Rosemount Inc. of Chanhassen, Minn. Pressure transmitters are also shown in U.S. Pat. No. 5,094,109, for example.

In many installations where differential pressure is measured, it is frequently also desirable obtain a line pressure measurements (i.e., the pressure of the process fluid in the pipe or conduit) For example, the line pressure can be used for determining mass flow of process fluid, or for other control applications. However, when a line pressure measurement is required in addition to the differential pressure measurement, an additional pressure sensor is typically required. This additional pressure sensor requires additional components and coupling to the process fluid. This leads to increased complexity and expense, as well as increasing the likelihood of failure.

Further, many pressure sensing technologies are coupled to process fluid through an isolation arrangement which uses an isolation diaphragm exposed to process fluid and an isolation fill fluid which couples the pressure sensor to the isolation diaphragm. This isolation arrangement is also a source of errors, complexity, and potential failure in process devices.

SUMMARY

A pressure sensor includes a deformable sensor body formed of a compressible material. A deformation sensor is embedded in the deformable sensor body and has an electrical property which changes in response to deformation of the deformable sensor body. Electrical connections extend from outside the deformable sensor body to the embedded deformation sensor.

DETAILED DESCRIPTION

The present invention relates to pressure sensors of the type used in pressure transmitters of industrial process control systems. With the present invention, a pressure sensor is provided which includes a deformable sensor body formed of a compressible glass material. The deformable sensor body can be made of glass, ceramic, plastic or other stable rigid insulator. As used herein the term "glass" includes any stable insulating material. A deformation sensor is embedded within the sensor body. This deformation sensor has an electrical property which changes in response to deformation of the deformable sensor body. Electrical connections are provided which extend through the sensor body to the deformation sensor. The sensor body is exposed to an applied pressure. As the body deforms, the electrical property of the deformation sensor changes and the applied pressure can be determined. This configuration can be implemented by embedding the deformation sensor in a differential pressure sensor such that a line pressure can be determined. Additionally, such a configuration can be used as a pressure sensor which can be directly exposed to process fluid without the use of the isolation fill fluid arrangement discussed in the background section. The invention can be used to measure line pressure as well as differential pressure using appropriate embedded deformation sensor configurations.

Figure 1:
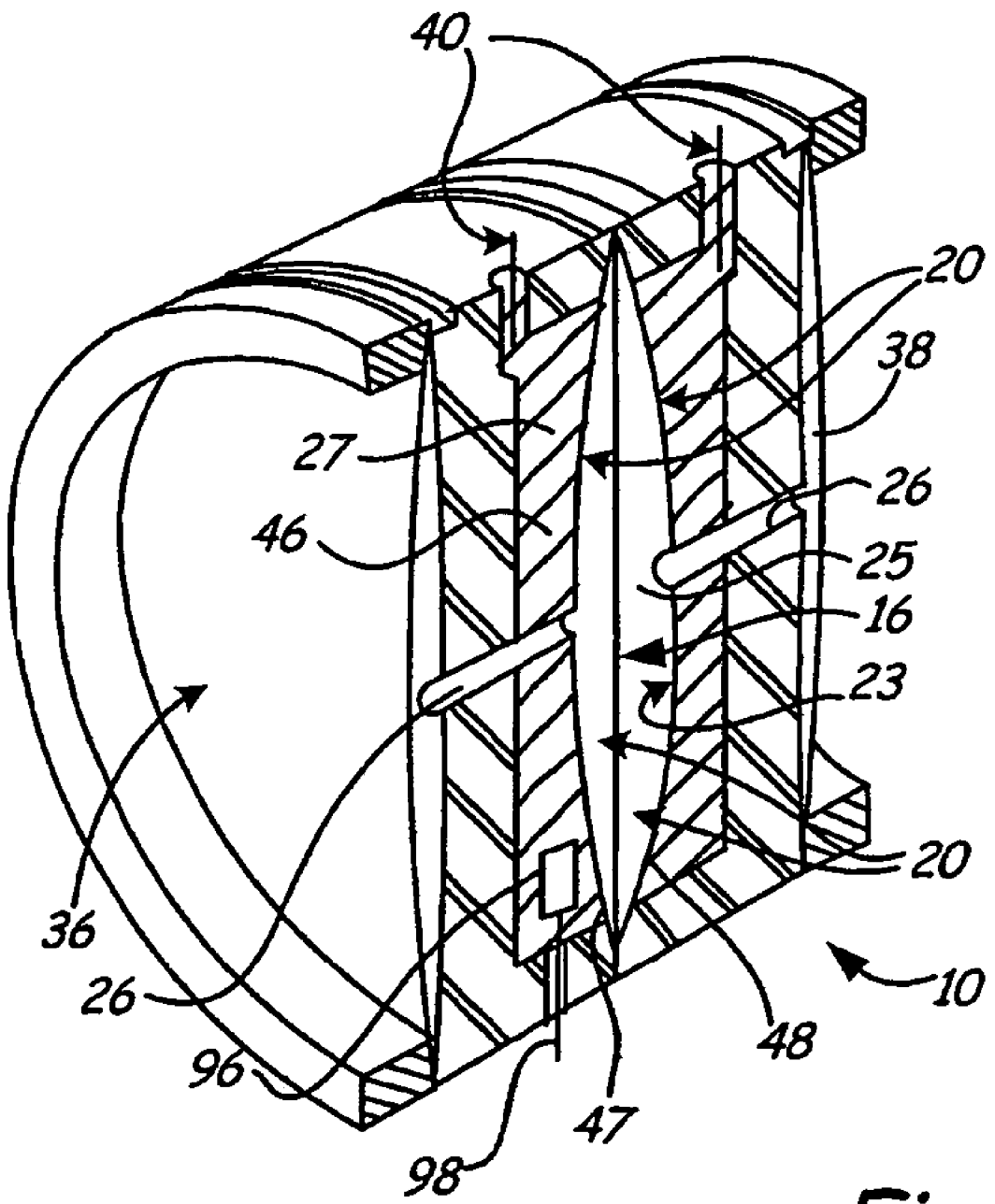
FIG. 1 is a cross-sectional perspective view of a pressure sensor in accordance with the present invention.

FIG. 1 is a perspective cross-sectional view of a differential pressure sensor 10 in accordance with the present invention. Pressure sensor 10 is one example of differential pressure sensor configuration and includes mounted isolation diaphragms 36 and 38 which couple to a pressure connection 26 which extends through the sensor body 27. The sensor body is formed of half cells 46 and 48 and comprises a compressible glass material. A cavity 25 within sensor 10 carries a fill fluid. A moveable diaphragm 16 extends across the cavity 25 and is configured to move in response to an applied differential pressure. Electrodes (capacitor plates) 20 are arranged on a wall 23 of the sensor 10. Electrical connections 40 coupled to the electrodes 20 and the diaphragm 16 are used to measure electrical capacitance therebetween. This capacitance varies as the diaphragm moves in response to the applied pressure and can be used to determine the applied differential pressure.

In accordance with the present invention, an embedded deformation sensor 96 is carried within the deformable body 27 of the pressure sensor 10. An electrical connection 98 is provided to the deformation sensor.

As differential pressure is applied to the sensor body 27 through pressure connections 26, in addition to movement of the diaphragm 16, the overall shape of the sensor body 27 also changes in response to the line pressure. This deformation in the shape of the sensor body is detected by deformation sensor 96 and can be sensed through electrical connection 98. The sensor 96 can be in accordance with any appropriate technology. In some configurations, fabrication of the pressure sensor 10, and in particular the glass body 27, requires exposure to relatively high temperatures. The selected deformation sensor 96 should be of a configuration which is capable of withstanding the supplied high temperature.

Figure 2:
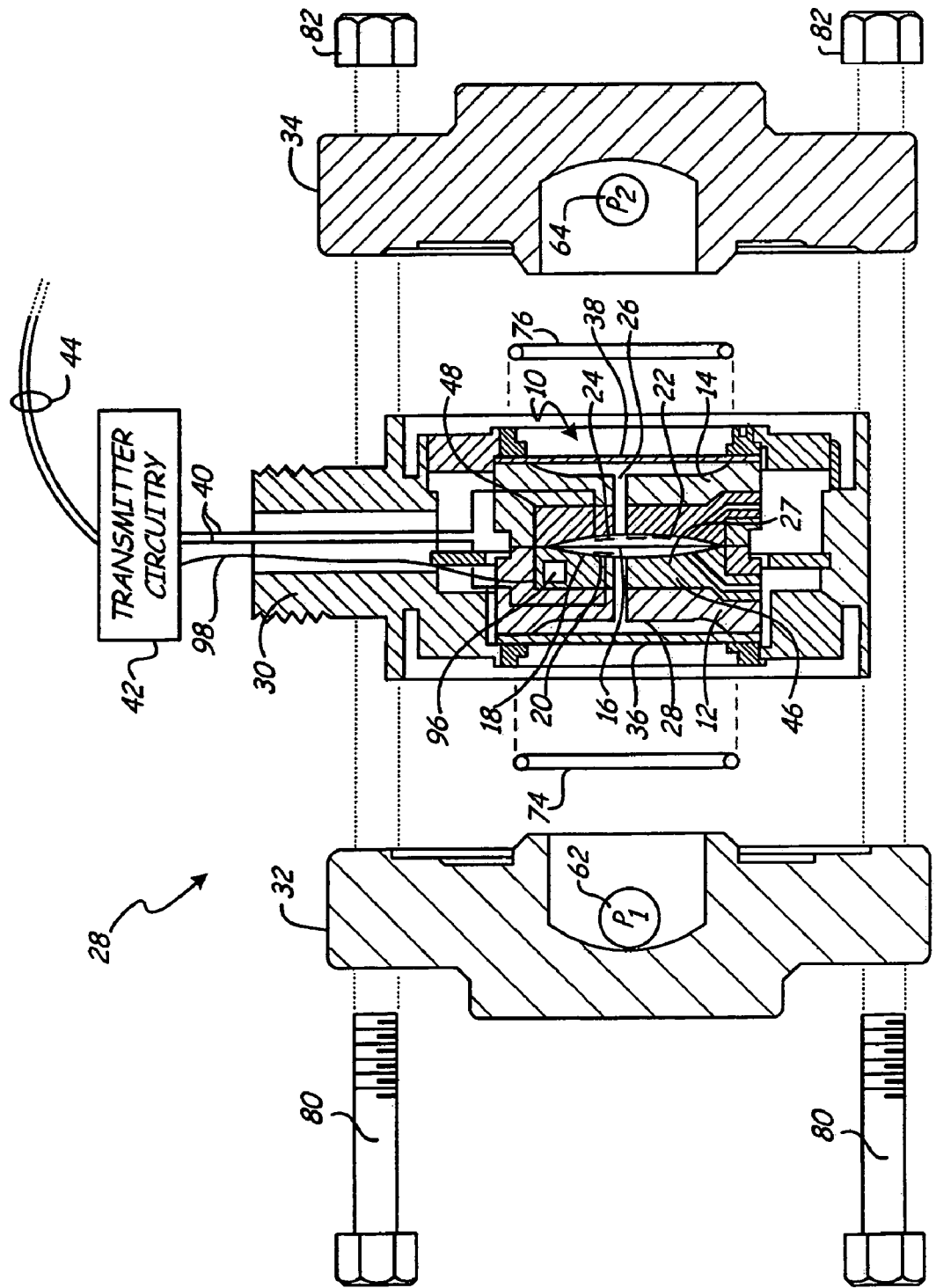
FIG. 2 is an exploded cross-sectional view of the pressure sensor of FIG. 1 in a pressure transmitter.

FIG. 2 is an exploded cross-sectional view of pressure sensor 10 in housing 30 of pressure transmitter 28 positioned between flanges 32 and 34. Flanges 32 and 34 are coupled to housing 30 by bolts 80 secured by nuts 82 and sealed by O-ring 74 and 76, respectively. Pressure $P_1$ is applied through port 62 in flange 32 to isolation diaphragm 36. Similarly, pressure $P_2$ is applied through port 64 in flange 34 to isolation diaphragm 38.

In operation, pressures $P_1$ and $P_2$ press against respective isolation diaphragms 36 and 38 thereby pressing on a substantially incompressible fill fluid which fills the cavity between center diaphragm and isolation diaphragms 36 and 38. This causes center diaphragm 16 to deflect resulting in a change in capacitance between diaphragm 16 and electrode 20 and diaphragm 16 and electrode 24. Electrical conductors 40 couple transmitter circuitry 42 to electrodes 20 and 24. Transmitter circuitry 42 provides an output related to pressures $P_1$ and $P_2$ as a function of capacitance between electrodes 20, 24 and center diaphragm 16 over, for example, a two wire process control loop 44. Such process control loops are known in the process control industry and may comprise, for example, a 4-20 mA current loop.

FIG. 2 also illustrates the deformation sensor 96 carried in the pressure sensor 10. Deformation sensor 96 couples to transmitter circuitry 42 through electrical connection 98. The transmitter circuitry 42 is configured to measure an electrical property of deformation sensor 96 which changes in response to the deformation of the glass body 27 of the pressure sensor 10 due to applied pressures $P_1$ and $P_2$. Based upon this measurement, a determination can be made which is indicative of the line pressure applied to the differential pressure sensor 10.

Figure 3:
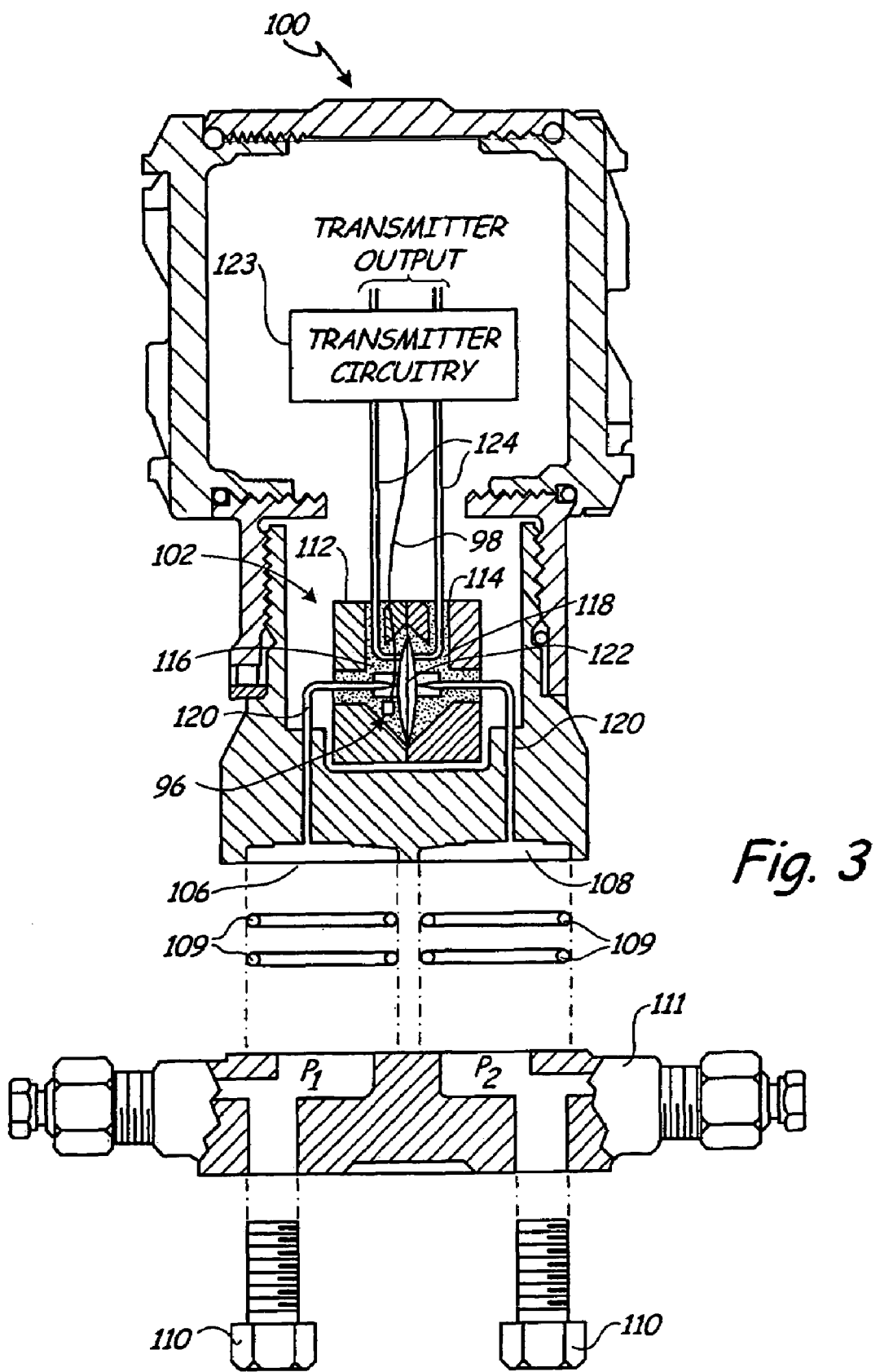
FIG. 3 is a cross-sectional view of an example pressure transmitter in accordance with the invention.

FIG. 3 is a cross-sectional view of a transmitter 100 including a pressure sensor 102 in accordance with another embodiment of the present invention. Transmitter 100 is known in the industry as having a Coplanar™ platform because isolation diaphragms 106 and 108 are aligned generally in the same plane. Flange 111 couples to transmitter 100 through bolts 110 to thereby couple pressure $P_1$ and $P_2$ to isolation diaphragms 106 and 108. Gaskets 109 provide a seal between flange 111 and isolation diaphragm 106, 108. A substantially incompressible fluid is carried in capillaries 120 which couple to pressure sensor 102. Similar to pressure sensor 10, sensor 102 is formed from two half cells 112, 114 filled, respectively, with glass material 116, 118. Electrical conductors 124 couple to capacitor plates (not shown) which are carried on sensor surfaces of brittle materials 116, 118. A diaphragm 122 deflects in response to applied pressures $P_1$ and $P_2$ causing a capacitive change which is detected by transmitter circuitry 123 which provides an output related to pressures $P_1$ and $P_2$ over a two wire process control loop.

As discussed above, a deformation sensor 96 is carried within the glass material 116,118 of the pressure sensor body. This deformation sensor 911 has an electrical characteristic which is sensed by transmitter circuitry 123 and can be correlated to the line pressure applied by pressures $P_1$ and $P_2$ to the overall pressure sensor body.

The deformation sensor 96 can be in accordance with any appropriate technology. Preferably, the sensor 96 is capable of withstanding any environmental extremes which the pressure sensor 10 must undergo. For example, during manufacture, the glass material which makes up the sensor body is subjected to high temperature (for example 800 to 850° C.). The sensor 96 can be, for example, a strain gauge element made of a "free filament" type structure which requires no additional backing material and can be configured to operate at temperatures as high as 1150° C. Example strain gauge materials include:

Kanthal Tm (Fe, Cr, Al alloy) rated as high as 1150° C.
Karma (75% Ni, 20% Cr, 3% Al, 3% Fe)
Platinum-Iridium (95%, 5%)
Nichrome (80% Ni, 20% Cu)

Figure 4:
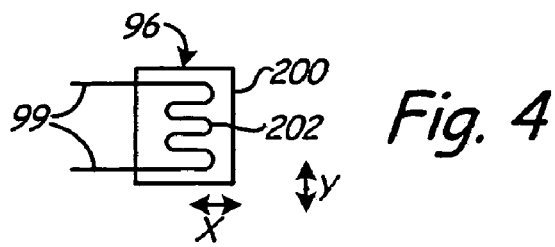
FIG. 4 is a plan view of one example deformation sensor.

FIG. 4 is a plan view of one example deformation sensor 96 which is fabricated on a substrate 200 which carries a strain gauge filament 202. One example material for substrate 200 is a semi-conductor material such as a polysilcon or carbon (for example fibers or nano-tubes). Although FIG. 4 illustrates a single strain gauge element, other configurations can also be used including bridge configurations.

During operation, the deformation sensor 96 output is related to the applied line pressure and provides a sufficiently high signal level for use in determining line pressure measurements over a desired range. For example, between 100 to 1000 psi. The deformation sensor can comprise a strain gauge element, for example having a resistance of 5000 ohms with a 2 to 4 gauge factor. Further, with reference to FIG. 4, the relationship between the compressibility of the glass in which the sensor is embedded and the applied pressure is relatively constant and therefor does not introduce errors into the measurements. Additionally, in some configurations, additional strain gauges or sensors 107 (see FIG. 5) can be provided and oriented so they are not effected by the applied line pressure. Such an additional strain gauge can be used as a compensation sensor 107, for example, as a reference or used to determine a temperature of the sensor. The glass materials that are currently used for the sensor body are typically relatively stable. The sensor bodies are also used to carry electrodes for generation of capacitance signals related to differential pressure. Sensors can be relatively easily fabricated on a high temperature substrate (such as ceramic, silicon, or the like) and fabricated in a manner similar to currently used PRT temperature sensors. In some configurations, the glass sensor body may require additional glass to provide stress relief and an additional burn-in period.

Figure 5:
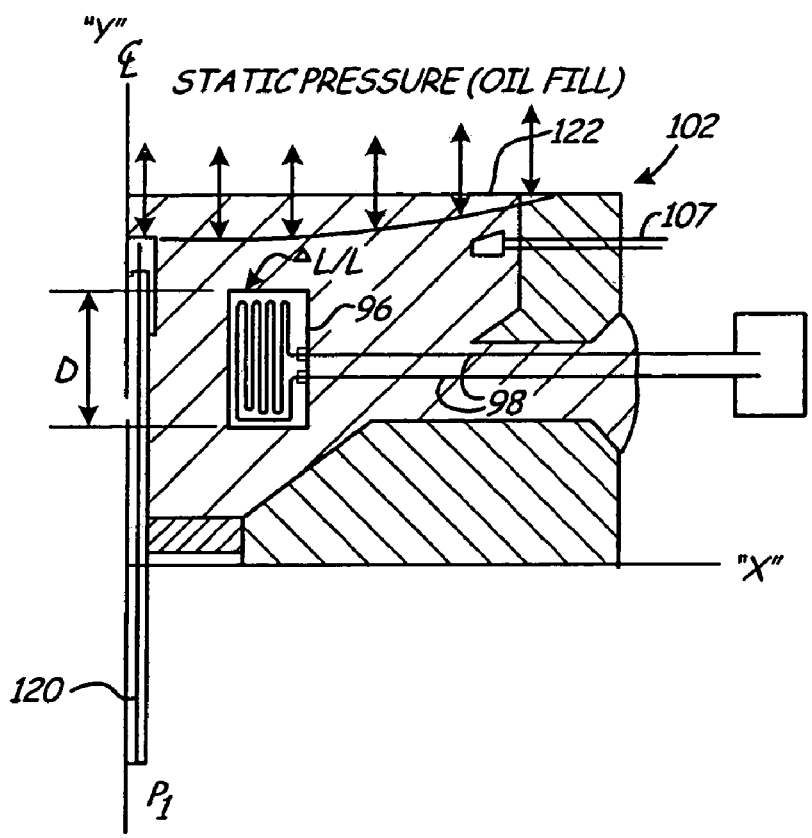
FIG. 5 is a partial cross-sectional view of a pressure sensor including a deformation sensor.

FIG. 5 is a partial cross-sectional view showing a more detailed configuration of the pressure sensor 102. As illustrated in FIG. 5, the deformation sensor 96 is configured as a strain gauge which under goes deformation $\Delta L/L$. This results in a change of resistance as measured across electrical connection 98 of $\Delta$ohms/static pressure. In one example configuration, sensor 96 has a length D of approximately 0.2 inches.

Figure 6A:
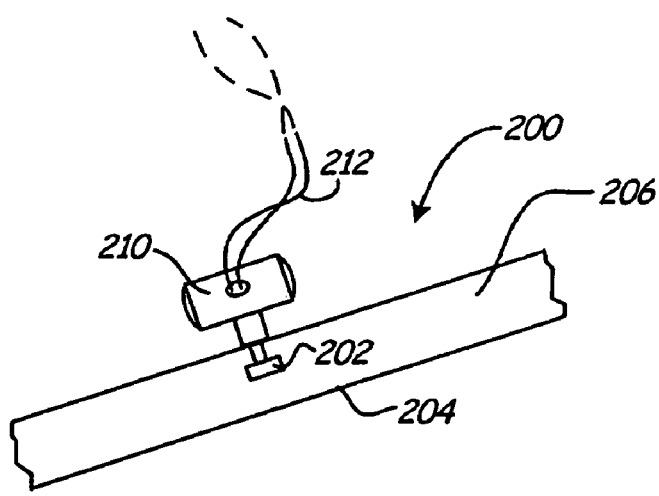
FIG. 6A is a simplified diagram of a process system including a pressure sensor directly exposed to process fluid.

FIG. 6A is a simplified diagram of an industrial process 200 including a pressure sensor 202 in accordance with the present invention which is fabricated to include a deformation sensor as discussed above carried in a deformable glass body of the sensor. The pressure sensor 202 is directly exposed to process fluid 206 carried in process piping 204. This is a simplified configuration of an "oil-less" sensing technology which does not require the isolation fill fluid discussed in the background section. The pressure sensor 202 is a part of a process transmitter 210 configured to couple to a two wire process control loop 212 in accordance with known techniques.

Figure 6B:
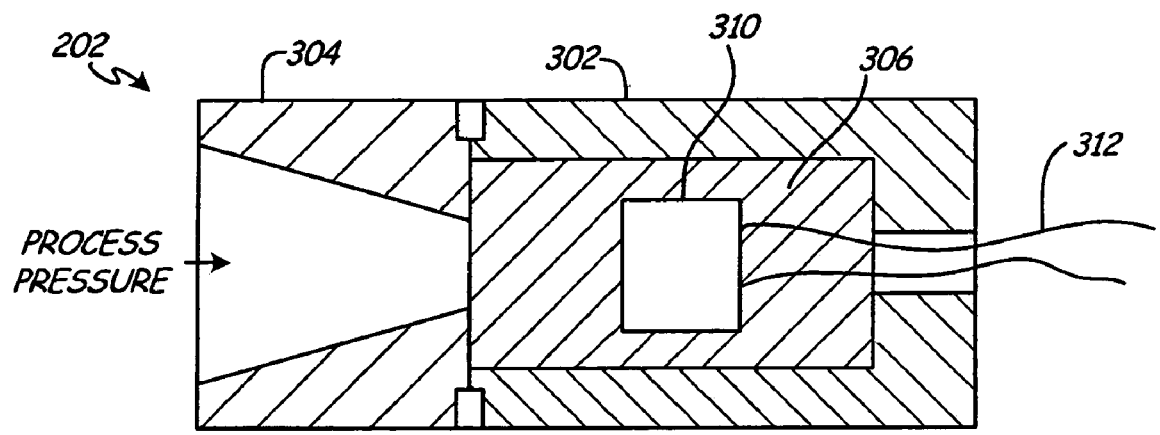
FIG. 6B is a cross-sectional view of a pressure sensor configured for direct exposure to process fluid.

FIG. 6B is a cross-sectional view of a pressure sensor 202 in accordance with the present invention configured to be directly exposed to process fluid. A process coupling 304 is configured to couple, for example, process piping. Pressure sensor body 302 carries a rigid insulator 306 such as a glass (including a ceramic). A compression or strain sensor 310 is contained within the insulator 306 and coupled to pressure measurement circuitry (see, for example, 123 in FIG. 3) through electrical connections 312. In various embodiments, active circuitry can be contained in sensor 310.

Figure 7:
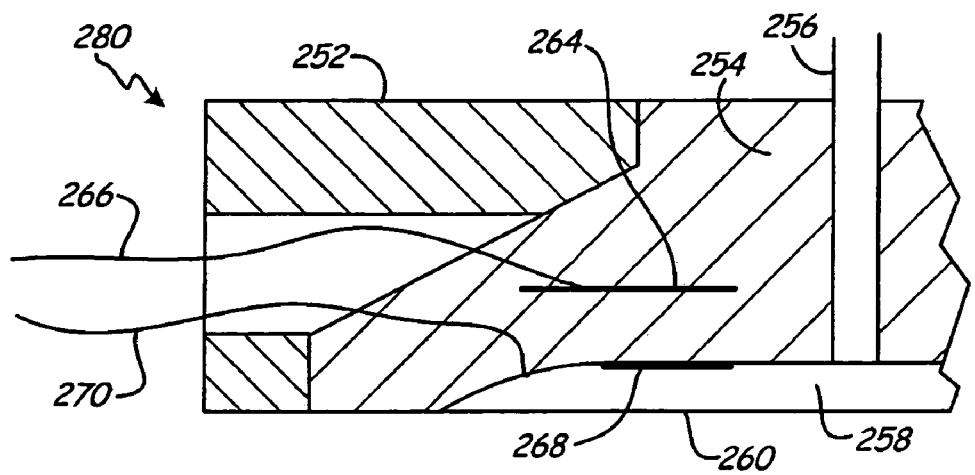
FIG. 7 is a side cross-sectional view of a pressure sensor including a capacitance based deformation sensor.

In another example embodiment illustrated in FIG. 7, rather than using a strain gauge as a deformation sensor, embedded capacitive plates are provided to sense deformation. Such a configuration can be used to measure a differential pressure. FIG. 7 is a cross-sectional cut away view of a pressure sensor 250 in accordance with another example embodiment. Sensor 250 includes sensor body 252 filled with a dielectric material 254 coupled to a process pressure through impulse piping 256. A cavity 258 is formed within the pressure sensor 250 and couples to impulse piping 256.

The cavity 258 is formed by diaphragm 260 which moves in response to the applied pressure. A capacitor formed by plate or electrode 264 which is carried within dielectric 254 and electrode 268. Electrode 264 is coupled to electrical connection 266. Second capacitor plate 268 is carried in dielectric 254 or, for example, on a surface on the outer edge of cavity 258 and couples to electrical connection 270. Using the capacitor plates 264 and 268, a capacitance is formed therebetween. As the shape of the pressure sensor 250 deforms in response to the applied pressure as discussed above, the electrical capacitance between plates 264 and 268 also varies. By measuring this capacitance, the deformation of sensor 250 can be determined and used in accordance with the techniques discussed above.

Although the above description has discussed embedding the deformation sensor into a glass, other material can be used which have desirable characteristics and are formed of a solid compressible substance. Examples include plastics or the like. Any appropriate technology for sensing deformation can be used such as capacitance, strain gauge, optical techniques, silicon techniques, etc. Further, other types of sensors which can be embedded in the solid material include temperature sensor for use in compensation for measurements. Further, multiple sensors can be used for safety, redundancy, self-validation or the like.

What is claimed is:

1. A pressure sensor, comprising;
   a deformable sensor body formed of a compressible material;
   first and second pressure connections to the deformable sensor body configured to receive first and second pressures;
   differential pressure electrical connections extending from the deformable sensor body which provide an electrical property which changes based upon a pressure differential between the first and second pressures;
   an embedded deformation sensor embedded in the deformable sensor body having an electrical property which changes in response to deformation of the deformable sensor body; and
   electrical connections which extend from outside the deformable sensor body to the embedded deformation sensor.

2. The apparatus of claim 1 wherein the deformable sensor body comprises a glass sensor body formed of a compressible glass material.

3. The apparatus of claim 1 wherein the deformation sensor comprises a strain gauge.

4. The apparatus of claim 3 wherein the strain gauge is carried on a substrate.

5. The apparatus of claim 3 wherein the strain gauge comprises a resistive element having a resistance which varies in response to strain.

6. The apparatus of claim 1 wherein the deformation sensor includes a compensation sensor.

7. The apparatus of claim 1 including a temperature sensor.

8. The apparatus of claim 1 wherein the deformation sensor comprises a capacitor.

9. The apparatus of claim 1 wherein the pressure sensor includes a diaphragm in the deformable sensor body.

10. The apparatus of claim 9 wherein the diaphragm is configured to deflect in response to an applied pressure.

11. The apparatus of claim 10 wherein the diaphragm is configured to deflect in response to the pressure differential applied to the pressure sensor.

12. The apparatus of claim 1 wherein the pressure sensor couples to a process fluid through an isolation fluid.

13. The apparatus of claim 1 wherein the pressure sensor is configured to directly contact a process fluid.

14. A process control transmitter including transmitter circuitry coupled to the pressure sensor of claim 1.

15. The apparatus of claim 14 wherein the transmitter circuitry is configured to determine a differential pressure and a line pressure based upon electrical characteristics of the pressure sensor.

16. The apparatus of claim 1 wherein the electrical property of the embedded deformation sensor is related to an applied line pressure.

17. The apparatus of claim 1 wherein the electrical property of the embedded deformation sensor is related to an applied differential pressure.

18. A method of measuring pressure, comprising:
    determining differential pressure based upon deflection of a diaphragm carried in a deformable sensor body; and
    determining line pressure based upon deformation of the deformable sensor body sensed with a deformation sensor.

19. The method of claim 1 wherein deformation is measured with a strain gauge.

20. The method of claim 19 wherein the strain gauge is embedded in the deformable sensor body.

* * * * *